United States Patent
Kato et al.

(10) Patent No.: US 9,911,546 B2
(45) Date of Patent: Mar. 6, 2018

(54) CURRENT COLLECTOR, ELECTRODE STRUCTURE, NONAQUEOUS ELECTROLYTE BATTERY, ELECTRICAL STORAGE DEVICE, AND NITROCELLULOSE RESIN MATERIAL

(75) Inventors: Osamu Kato, Chiyoda-ku (JP); Sohei Saito, Chiyoda-ku (JP); Yukiou Honkawa, Chiyoda-ku (JP); Mitsuyuki Wasamoto, Chuo-ko (JP); Kenichi Kadowaki, Chuo-ku (JP); Tsugio Kataoka, Chuo-ku (JP)

(73) Assignees: UACJ CORPORATION, Tokyo (JP); UACJ FOIL CORPORATION, Tokyo (JP)

( * ) Notice: Subject to any disclaimer, the term of this patent is extended or adjusted under 35 U.S.C. 154(b) by 318 days.

(21) Appl. No.: 14/235,750

(22) PCT Filed: Jul. 29, 2011

(86) PCT No.: PCT/JP2011/067461
§ 371 (c)(1),
(2), (4) Date: May 9, 2014

(87) PCT Pub. No.: WO2013/018159
PCT Pub. Date: Feb. 7, 2013

(65) Prior Publication Data
US 2014/0315094 A1    Oct. 23, 2014

(51) Int. Cl.
| | |
|---|---|
| *H01M 4/80* | (2006.01) |
| *H01G 11/68* | (2013.01) |
| *H01B 1/12* | (2006.01) |
| *H01M 4/66* | (2006.01) |
| *H01G 11/28* | (2013.01) |
| *H01M 10/0525* | (2010.01) |

(52) U.S. Cl.
CPC ............ *H01G 11/68* (2013.01); *H01B 1/122* (2013.01); *H01M 4/66* (2013.01); *H01M 4/667* (2013.01); *H01M 4/668* (2013.01); *H01G 11/28* (2013.01); *H01M 4/661* (2013.01); *H01M 10/0525* (2013.01); *Y02E 60/13* (2013.01)

(58) Field of Classification Search
CPC ...... H01M 4/661; H01M 4/662; H01M 4/134; H01M 4/667; H01M 4/668; H01M 4/62–4/623
See application file for complete search history.

(56) References Cited

U.S. PATENT DOCUMENTS

| | | | |
|---|---|---|---|
| 3,770,509 A | 11/1973 | Winsel | |
| 5,589,297 A * | 12/1996 | Koga et al. | 429/212 |
| 6,803,150 B1 | 10/2004 | Iriyama | |
| 2004/0128813 A1 | 7/2004 | Murakami | |
| 2004/0260020 A1* | 12/2004 | Miyake et al. | 525/61 |
| 2012/0021273 A1* | 1/2012 | Ohmori et al. | 429/144 |

FOREIGN PATENT DOCUMENTS

| | | | |
|---|---|---|---|
| EP | 1 798 743 A1 | 6/2007 | |
| EP | 2 306 561 A1 | 7/2009 | |
| GB | 955446 A * | 4/1964 | H01J 9/042 |
| JP | 62-160656 A | 7/1987 | |
| JP | 02-109256 A | 4/1990 | |
| JP | 11-162787 A | 6/1999 | |
| JP | 2004-186209 A | 7/2004 | |
| JP | 2010-021203 A | 1/2010 | |
| JP | 2010-278125 A | 12/2010 | |
| WO | 00/01021 A1 | 1/2000 | |
| WO | 2010/109783 A1 | 9/2010 | |
| WO | WO 2010110465 A1 * | 9/2010 | |

OTHER PUBLICATIONS

Dr. John Muter, "An Introduction to Pharmaceutical and Medical Chemistry", Published 1880 by Presley Blakiston, 2nd Edition, p. 238.*
Extended European Search Report dated Nov. 27, 2014, issued in corresponding International Application No. PCT/JP2011067461, dated Jul. 29, 2011, 6 pages.
International Search Report dated Oct. 25, 2011, issued in corresponding International Application No. PCT/JP2011/067461, dated Jul. 29, 2011, 3 pages.

* cited by examiner

*Primary Examiner* — Jimmy K Vo
(74) *Attorney, Agent, or Firm* — Christensen O'Connor Johnston Kindness PLLC

(57) ABSTRACT

A current collector which is suitable for discharging and charging at a large current density is provided. The present invention provides a current collector including a conductive substrate and a conductive resin layer provided on one side or both sides of the conductive substrate. The conductive resin layer contains a soluble nitrocellulose-based resin and a conductive material.

8 Claims, No Drawings

CURRENT COLLECTOR, ELECTRODE STRUCTURE, NONAQUEOUS ELECTROLYTE BATTERY, ELECTRICAL STORAGE DEVICE, AND NITROCELLULOSE RESIN MATERIAL

TECHNICAL FIELD

The present invention relates to a current collector suitable for charge and discharge at a large current density, an electrode structure using the current collector, a non-aqueous electrolyte battery using the electrode structure, an electrical storage device (example: electrical double layer capacitor, lithium ion capacitor), and to a soluble nitrocellulose-based resin material for the current collector.

BACKGROUND ART

Conventionally, a non-aqueous electrolyte battery as represented by a lithium ion battery have been receiving a demand for reduction in charging time. In order to meet such demand, the battery must be capable of being charged at high speed with a large current density. In addition, a non-aqueous electrolyte battery for automobiles have been receiving a demand for the ability to discharge high power at a large current density, in order to provide the automobile with sufficient accelerating property. When conducting charge and discharge at a large current density, internal resistance of the battery is important to improve the characteristics of maintaining battery capacity (high rate characteristics). The same can be said for other non-aqueous electrolyte batteries such as an electrical double layer capacitor and a lithium ion capacitor, and an electrical storage device.

In general, the cause of the internal resistance are electrical resistance of the constituting material, interface resistance between the constituting components, conductivity resistance of the ions which are the charged particles in the electrolyte solution, electrode reaction resistance, and the like. Therefore, each of the resistance need be decreased in order to decrease the internal resistance. Among them, one of the most important internal resistance is the interface resistance between the conductive substrate comprising a metal foil (for example, aluminum foil, copper foil and the like) and an active material layer. It has been known that one measure to decrease the interface resistance is to improve the adhesion in the interface.

In order to improve the adhesion between the current collector and the active material layer, a technique in which the current collector is coated with a conductive resin, and then a paste for forming an active material layer is coated thereon, has been conventionally proposed. Patent Literature 1 discloses a technique to form a conductive coating by coating a positive electrode current collector with a conductive coating including a conductive filler, vinyl butyral as a binding agent, and dibutyl phthalate as a plasticizing agent. Patent Literature 2 discloses a technique to form a conductive coating including a polyacrylic acid or a copolymer of an acrylic acid and an acrylic acid ester as a main binding agent, and a carbon powder as a conductive filler.

CITATION LIST

Patent Literature

[Patent Literature 1] JPH2-109256A
[Patent Literature 2] JPS62-160656A

SUMMARY OF INVENTION

Technical Problem

However, there were cases where sufficient high rate characteristics cannot always be obtained, and the lifetime of the battery was unsatisfactory. In order to decrease the interface resistivity between the current collector (comprising a conductive substrate and a conductive resin) and an active material layer, not only the adhesion between the conductive resin layer of the current collector and the active material layer being high is important, but the volume resistivity of the conductive resin layer itself being low is also important. Here, adhesion directly affects the interface resistance between the conductive resin layer and the active material layer and affects the lifetime of the battery, and the term "adhesion" means that there is no detachment even when the interface is permeated with electrolyte solution and the layers are adhered firmly. In addition, concerning a positive electrode and a negative electrode of a non-aqueous electrolyte battery or a lithium ion capacitor, since the volume of the active material in the active material layer changes by charging and discharging, the active material easily becomes detached from the active material layer. Therefore, detachment between the active material layer and the current collector easily occur. Since the volume change in the active material at high rate charging and discharging is large, high adhesion between the conductive resin layer and the active material layer is especially required. However, in conventional techniques, the adhesion between the conductive resin layer and the active material layer was low, and the lifetime of the battery was unsatisfactory. In addition, decrease in the volume resistivity of the conductive resin layer itself was not sufficient.

An object of the present invention is to provide a current collector which can decrease the internal resistivity of a non-aqueous electrolyte battery, and can suitably be used for an electrical storage device of a non-aqueous electrolyte battery such as lithium ion secondary battery and the like, electrical double layer capacitor, lithium ion capacitor and the like. The current collector can further improve the high rate characteristics and can elongate the lifetime of the battery. The current collector of the present invention can provide an electrode structure having superior adhesion in the active material layer and the electrode material layer, by further forming an active material layer or an electrode material layer. In addition, the non-aqueous electrolyte battery using the electrode structure, the electrode structure having an active material layer formed on the current collector of the present invention, can achieve high rate characteristics by decreasing the internal resistance of the current collector having the afore-mentioned characteristics. Further, the present invention provides an electrical storage device such as an electrical double layer capacitor, lithium ion capacitor and the like, which requires high-speed charging and discharging of a large current. Such electrical storage device is used in copy machines and automobiles.

Solution to Problem

The inventors of the present invention have investigated the constitution of the current collector used for the positive electrode of a lithium ion secondary battery. Accordingly, the inventors have found that high rate characteristics and lifetime of the battery can be improved by using a resin containing a soluble nitrocellulose-based resin and a conductive material as a resin layer, such resin being applied as a base coat when forming the active material layer, thereby leading to completion of the present invention. By using such current collector, improvement in high rate characteristics can be achieved and a non-aqueous electrolyte battery, an electrical double layer capacitor, or a lithium ion capacitor with elongated battery lifetime can be obtained.

That is, the present invention provides a conductive substrate and a current collector structured by applying a conductive resin layer on one side or both sides of the conductive substrate, wherein the conductive resin layer includes a soluble nitrocellulose-based resin and a conductive material.

Various embodiments will be provided hereinafter. The embodiments exemplified hereinafter can be combined with each other.

Preferably, the soluble nitrocellulose-based resin of the current collector includes a soluble nitrocellulose and at least one resin selected from the group consisting of a melamine-based resin, an acryl-based resin, a polyacetal-based resin, and an epoxy-based resin.

Preferably, the soluble nitrocellulose-based resin of the current collector includes a melamine resin, a soluble nitrocellulose, and at least one resin selected from the group consisting of an acryl-based resin and a polyacetal-based resin.

Preferably, in the afore-mentioned current collector, the melamine-based resin is contained by 5 to 55 mass %, and the soluble nitrocellulose is contained by 40 to 90 mass %, when the total of the acryl-based resin, the polyacetal-based resin and the soluble nitrocellulose is 100 mass %.

Preferably, the surface of the conductive resin layer of the afore-mentioned current collector has a water contact angle of 80 degrees or more and 125 degrees or less, preferably 90 degrees or more and 110 degrees or less, when measured by θ/2 method in a thermostatic chamber at 23° C.

Preferably, an electrode structure comprises the afore-mentioned current collector and an active material layer or an electrode material layer on the conductive resin layer of the current collector.

Preferably, in the electrode structure, the conductive resin layer of the current collector contains an active material.

Preferably, a non-aqueous electrolyte battery or an electrical storage device comprises the afore-mentioned electrode structure.

Preferably, a conductive resin material for a current collector comprises a soluble nitrocellulose-based resin, and a conductive material.

Preferably, in the soluble nitrocellulose-based resin material, the soluble nitrocellulose-based resin contains a soluble nitrocellulose and at least one resin selected from the group consisting of a melamine-based resin, an acryl-based resin, a polyacetal-based resin, and an epoxy-based resin.

Preferably, in the soluble nitrocellulose-based resin material, the soluble nitrocellulose-based resin contains a melamine-based resin, a soluble nitrocellulose, and at least one resin selected from the group consisting of an acryl-based resin and a polyacetal-based resin.

Preferably, in the soluble nitrocellulose-based resin material, the melamine-based resin is contained by 10 to 40 mass %, and the soluble nitrocellulose is contained by 50 to 70 mass %, when the total of the acryl-based resin, the polyacetal-based resin and the soluble nitrocellulose is 100 mass %.

Advantageous Effects of Invention

The current collector of the present invention is superior in the high rate characteristics, and is suitable for charging and discharging at high speed with a large current density, and can achieve long lifetime. In addition, when the electrode structure, non-aqueous electrolyte solution battery such as lithium ion battery and the like, and an electrical storage device such as an electrical double layer capacitor, lithium ion capacitor and the like are provided with the current collector of the present invention, they are superior in high rate characteristics, superior in charging and discharging at high speed with a large current density, and can achieve long lifetime.

DESCRIPTION OF EMBODIMENTS

The current collector of the present invention comprises a conductive substrate and a conductive resin layer provided on one side or both sides of the conductive substrate, wherein the conductive resin layer includes a soluble nitrocellulose-based resin and a conductive material.

The details are explained hereinafter.

<1. Conductive Substrate>

As the conductive substrate of the present invention, various metal foils for a non-aqueous electrolyte battery, for an electrical double layer capacitor, or for a lithium ion capacitor, can be used. In particular, aluminum, aluminum alloy, copper, stainless steel, nickel and the like can be used. Among them, aluminum, aluminum alloy and copper are preferable in view of the balance between the high conductivity and the cost. When aluminum foil is used as a positive electrode, it is preferable to use a pure-aluminum foil such as those satisfying JIS A1085 having high conductivity, since the present invention is aimed at improving the high rate characteristics. There is no limitation for the thickness of the conductive substrate, however, preferable thickness is 0.5 μm or more and 50 μm or less, more preferably 7 to 100 μm, and further preferably 10 to 50 μm. When the thickness is less than 0.5 μm, the strength of the foil is insufficient and thus formation of the resin layer and the like becomes difficult. On the other hand, when the thickness exceeds 50 μm, other constituting components, especially the active material layer or the electrode material layer must be made thin for such excess in the thickness. This would result in cases where sufficient capacity for the electrical storage devices such as the non-aqueous electrolyte battery, the electrical double layer capacitor, or the lithium ion capacitor cannot be obtained.

<2. Conductive Resin Layer>

The conductive resin layer of the present invention (hereinafter referred to as "resin layer") is provided on one side or both sides of the afore-mentioned conductive substrate, and contains a soluble nitrocellulose-based resin and a conductive material.

<2-1. Conductive Resin>

In the present invention, the conductive resin is a resin which contains a soluble nitrocellulose as a resin component. The conductive resin may contain only the soluble nitrocellulose, or may contain the soluble nitrocellulose and another resin. The soluble nitrocellulose is a cellulose having a nitro group. When compared with other soluble celluloses such as carboxymethyl cellulose (CMC), application in electrodes have been exemplified, however, there have been no suggestion for its optimization. Therefore, optimization for proactive usage have not been conducted.

The inventors of the present invention have found that high rate characteristics of the non-aqueous electrolyte battery can be improved dramatically by forming a resin layer possessing conductivity in the following manner. First, a soluble nitrocellulose-based resin composition is obtained by dispersing a conductive material in the soluble nitrocellulose. Then, the resin layer having conductivity, including the soluble nitrocellulose-based resin and the conductive material is formed on the conductive substrate. The nitrogen concentration of the soluble nitrocellulose of the present invention is preferably 10 to 13%, and particularly preferably 10.5 to 12.5%. When the nitrogen concentration is too low, there are cases where the conductive material cannot be dispersed sufficiently, depending on the type of the conductive material. When the nitrogen concentration is too high, the soluble nitrocellulose becomes chemically unstable, and thus it would be dangerous to use it for the battery. Since the nitrogen concentration depends on the number of the nitro group, adjustment of the nitrogen concentration is conducted by adjusting the number of nitro group. In addition, it is preferable that the viscosity of the afore-mentioned soluble nitrocellulose, which is measured in accordance with JIS K-6703, is usually 1 to 6.5 seconds, particularly 1.0 to 6 seconds; and the acid content is 0.006% or lower, particularly 0.005% or lower. When these values exceed these range, there are cases where the dispersibility of the conductive material and the battery characteristics lower.

The soluble nitrocellulose-based resin of the present invention can contain the soluble nitrocellulose by 100 mass % (when the entire resin component is taken as 100 mass %), or other resin component may be used in combination. When the other resin component is used in combination, it is preferable that the soluble nitrocellulose is contained by 40 mass % or more, more preferably 50 mass % or more, 90 mass % or less, and particularly 80 mass % or less, with respect to the total resin component. Particular ratio of the soluble nitrocellulose is, for example, 40, 45, 50, 55, 60, 65, 70, 75, 80, 85, 90 mass %, and may be in the range of two values selected from the values exemplified above. Through an investigation conducted for the internal resistance of the conductive resin layer prepared by adding a conductive material to various resins, it became apparent that when the soluble nitrocellulose is contained by 50 mass % or more, the resistance of the resin layer can be greatly reduced, sufficient high rate characteristics can be obtained, adhesion becomes superior, and the lifetime of the product can be elongated. On the other hand, when the amount of soluble nitrocellulose formulated is too small, improvement in dispersibility of the conductive material, which is obtained as an effect of formulating the soluble nitrocellulose, may not be obtained. It is assumed that addition of 40 mass % or more of the soluble nitrocellulose can sufficiently lower the resistance of the resin layer.

The soluble nitrocellulose-based resin according to the present invention may be prepared by adding various resin to the afore-mentioned soluble nitrocellulose. In the present invention, battery performance (including capacitor performance, hereinafter the same) was investigated to find that it is preferable to add a melamine-based resin, an acryl-based resin, a polyacetal-based resin, or an epoxy-based resin in combination. By such addition, the battery performance can be improved to a level equal to or higher than the case where the soluble nitrocellulose is used as a resin component by 100 mass %. Each of the resin components will be described hereinafter. In the following explanation, the number average molecular weight and the weight average molecular weight are obtained by GPC (gel permeation chromatography).

It is assumed that the hardenability of the resin is improved, adhesion with the conductive substrate is improved, and the battery performance is improved, since the afore-mentioned melamine-based resin undergoes a hardening reaction with the soluble nitrocellulose. The amount of the melamine-based resin being added shall be, 5 to 200 mass %, more preferably 10 to 150 mass %, when the soluble nitrocellulose as the resin component is taken as 100 mass %. When the amount added is less than 5 mass %, the effect is low. When the amount added exceeds 200 mass %, hardening reaction overly proceeds and the resin layer becomes too hard. This would cause detachment during the manufacture of batteries, and there may be a case where the discharge rate characteristics decrease. As the melamine-based resin, butylated melamine, isobutylated melamine, methylated melamine and the like can be preferably used for example. The number average molecular weight of the melamine-based resin is, for example, 500 to 50,000, particularly for example 500, 1,000, 2,000, 2,500, 3,000, 4,000, 5,000, 10,000, 20,000, or 50,000. The number average molecular weight may be in the range of two values selected from the values exemplified above.

The afore-mentioned acryl-based resin has superior adhesion with a conductive substrate, especially with aluminum and copper. Therefore, addition of the acryl-based resin can improve the adhesion of the soluble nitrocellulose-based resin with the conductive substrate. The amount of the acryl-based resin being added shall be, 5 to 200 mass %, more preferably 10 to 150 mass %, when the soluble nitrocellulose as the resin component is taken as 100 mass %. When the amount added is less than 5 mass %, the effect is low. When the amount added exceeds 200 mass %, adverse effect is caused on the dispersibility of the conductive material. This may lead to a case where the discharge rate characteristics decrease. As the acryl-based resin, a resin containing acrylic acid, methacrylic acid, and derivatives thereof as a main component, or an acrylic copolymer including such monomers can preferably be used. In particular, methyl acrylate, ethyl acrylate, methyl methacrylate, isopropyl methacrylate and their copolymer can be used. In addition, acryl-based compounds having a polar group, such as acrylonitrile, methacrylonitrile, acryl amide, methacryl amide and the like, and a copolymer thereof can preferably be used. The weight average molecular weight of the acryl-based resin is, for example, 30,000 to 1,000,000, particularly for example 30,000, 40,000, 50,000, 60,000, 70,000, 80,000, 90,000, 100,000, 150,000, 200,000, 300,000, 400,000, 500,000, 600,000, 700,000, 800,000, 900,000, or 1,000,000. The weight average molecular weight may be in the range of two values selected from the values exemplified above.

The afore-mentioned polyacetal-based resin is superior in compatibility with the soluble nitrocellulose. Therefore, suitable flexibility can be provided to the resin layer, and thus adhesion with the active material layer can be improved. The amount of the polyacetal-based resin being added shall be, 5 to 200 mass %, more preferably 20 to 150 mass %, when the soluble nitrocellulose as the resin component is taken as 100 mass %. When the amount added is less than 5 mass %, the effect is low. When the amount added exceeds 200 mass %, adverse effect is caused on the dispersibility of the conductive material. This may lead to a case where the discharge rate characteristics decrease. As the polyacetal-based resin, polyvinylbutyral, polyacetoacetal, polyvinylacetoacetal and the like can preferably be used. The weight average molecular weight of the polyacetal-based resin is, for example, 10,000 to 500,000, particularly for example 10,000, 20,000, 30,000, 40,000, 50,000, 60,000, 70,000, 80,000, 90,000, 100,000, 150,000, 200,000, or 500,000. The weight average molecular weight may be in the range of two values selected from the values exemplified above.

Since the afore-mentioned epoxy-based resin is superior in adhesion with the conductive substrate, the adhesion with the conductive substrate can be further improved by adding the epoxy-based resin. The amount of the epoxy-based resin being added shall be, 5 to 200 mass %, more preferably 10 to 150 mass %, when the soluble nitrocellulose as the resin component is taken as 100 mass %. When the amount added is less than 5 mass %, the effect is low. When the amount added exceeds 200 mass %, adverse effect is caused on the dispersibility of the conductive material. This may lead to a case where the discharge rate characteristics decrease. As the epoxy-based resin, glycidyl ether type resins such as bisphenol A type epoxy resin, bisphenol F type epoxy resin, tetramethylbiphenyl type and the like are preferable. The weight average molecular weight of the epoxy-based resin is, for example, 300 to 50,000, particularly for example 300, 500, 1,000, 2,000, 3,000, 4,000, 5,000, 10,000, 20,000, or 50,000. The weight average molecular weight may be in the range of two values selected from the values exemplified above.

In the present invention, the soluble nitrocellulose based resin may contain the soluble nitrocellulose by 100% as the resin component, as described above. Here, it is more preferable that at least one type of the afore-mentioned acryl-based resin and the polyacetal-based resin, the melamine-based resin, and the soluble nitrocellulose are contained. By such combination, the discharge rate characteristics and the long life characteristics of the battery becomes particularly superior.

In addition, particularly when the total amount of the acryl-based resin, polyacetal-based resin, melamine-based resin, and the soluble nitrocellulose is taken as 100 mass %, it is further preferable that the amount of melamine-based resin is 5 to 55 mass %, and the amount of soluble nitrocellulose is 40 to 90 mass %. The amount of the acryl-based resin or the polyacetal-based resin to be formulated is the resulting amount when the amount of the melamine-based resin and the soluble nitrocellulose formulated is deducted from 100 mass %. In such case, the discharge rate characteristics and the long life characteristics of the battery becomes further superior. The amount of the melamine-based resin to be formulated is, in particular, 5, 10, 15, 20, 25, 30, 35, 40, 45, 50, or 55 mass %. The amount may be in the range of two values selected from the values exemplified above. The amount of the soluble nitrocellulose to be formulated is, in particular, 40, 45, 50, 55, 60, 65, 70, 75, 80, 85, or 90 mass %. The amount may be in the range of two values selected from the values exemplified above.

<2-2. Conductive Material>

The conductive resin layer of the present invention is provided in between the conductive substrate and the active material layer or the electrode material layer. The conductive resin layer functions as a pathway of electrons which moves between the conductive substrate and the active material layer or the electrode material layer, and thus electron conductivity is required. Since the soluble nitrocellulose-based resin itself is high in insulation properties, conductive material must be formulated in order to impart the electron conductivity. As the conductive material used in the present invention, publicly known carbon powder, metal powder and the like can be used. Here, among them, carbon powder is preferable. As the carbon powder, acetylene black, Ketjen black, furnace black, carbon nanotube and the like can be used. The amount of the conductive material to be added is preferably 40 to 100 mass %, more preferably 40 to 80 mass % with respect to 100 mass % of the resin component of the soluble nitrocellulose-based resin (solid content, hereinafter the same). When the added amount is less than 40 mass %, the volume resistivity of the resin layer becomes high, and when the added amount exceeds 100 mass %, the adhesion with the conductive substrate lowers. Conventional methods can be used to disperse the conductive material into the resin component solution of the soluble nitrocellulose-based resin. For example, the conductive material can be dispersed by using a planetary mixer, a ball mill, a homogenizer, and the like.

<2-3. Water Contact Angle>

The water contact angle of the surface of the conductive resin layer according to the present invention is preferably 80 degrees or more and 125 degrees or less, more preferably 90 degrees or more and 110 degrees or less. When the conductive material is merely added to the soluble nitrocellulose-based resin to form the resin layer, there are cases where sufficient adhesion at the interface of the conductive substrate and the resin layer, interface of the resin layer and the active material layer, or the interface of the resin layer and the electrode material layer cannot be obtained. This is since the state of the resin layer changes depending on the type of the resin and the conditions for forming the resin layer. Here, contact angle, which shows the wettability of a liquid, is a surface texture that possesses a large influence to the adhesion. Therefore, by obtaining the contact angle of water, which has relatively large surface tension, adhesion of the current collector and active material layer of the electrode material layer formed thereon can be evaluated. In this case, regarding the resin layer and the water contact angle, it may seem that the smaller the water contact angle is, the more the adhesion improves, and the more the discharge rate can be improved. However, when the contact angle is too small, there is a possibility that adverse effect is caused on the adhesion of the conductive substrate and on the discharge rate characteristics. Therefore, it is necessary to regulate the water contact angle in the present invention. This issue will also be discussed later.

In the present specification, water contact angle is a value obtained by θ/2 method in a thermostatic chamber at 23° C. The water contact angle can be obtained by using a contact angle meter. After forming a resin layer on the current collector, a few micro liters of pure water is adhered as a droplet onto its surface, and then the water contact angle is observed. Since the surface tension of the water varies by the change in temperature, the water contact angle is observed in a thermostatic chamber at 23° C.

As a result of measuring the water contact angle by forming resin layers in accordance with various conditions, it became apparent that when the water contact angle is 110 degrees or less, adhesion with the active material layer or the electrode material layer becomes particularly superior. In addition, an investigation on the relation of the water contact angle and the adhesion between the conductive substrate and the resin layer was made by forming resin layers having a different water contact angle. Accordingly, it became apparent that when the water contact angle of the surface of the resin layer is 90 degrees or more, the discharge rate characteristics becomes particularly superior. The reasons for such results are not clear, however, it is assumed that such difference is due to the subtle difference in the adhesion state of the conductive substrate and the resin layer. Therefore, it is especially preferable that the water contact angle is 90 degrees or more. As described, the regulation of the water contact angle according to the present invention has been made in view of not only the adhesion of the soluble nitrocellulose-based resin with the active material layer or the electrode material layer, but also in view of the adhesion of the conductive substrate with the resin layer. The current collector of the present invention thus regulated with its water contact angle can provide suitable discharge rate characteristics when used as an electrode structure for batteries and electrical storage device.

Regarding the current collector of the present invention, there is no particular limitation in the method for forming the conductive resin layer. Here, it is preferable to form the conductive layer by applying a soluble nitrocellulose-based resin material (solution, dispersion, or paste) including a soluble nitrocellulose-based resin and a conductive material onto a conductive substrate, followed by baking. As the method for coating, a roll coater, a gravure coater, a slit dye coater and the like can be used. In a case where the resin layer is formed by coating, the baking temperature, as the final temperature of the conductive substrate, is preferably 100 to 250° C., and the baking time is preferably 10 to 60 seconds. When the baking temperature is lower than 100° C., the soluble nitrocellulose-based resin would not harden sufficiently, and when the baking temperature exceeds 250° C., there are cases where the adhesion with the active material layer decreases. In addition, when the baking time is shorter than 10 seconds, the solvent would vaporize before the resin hardens, thereby causing defects in the resin layer. When the baking time exceeds 60 seconds, some temperature conditions may cause the foil to soften and thus results in insufficient strength.

In general, the water contact angle tends to become large as the baking temperature is raised and the baking time is made longer. Therefore, in order to obtain a resin layer having the water contact angle within the afore-mentioned range, the resin layer is formed with a particular condition first, and then the water contact angle of the resin layer thus formed is measured. When the water contact angle measured is smaller than the afore-mentioned lower limit, the baking temperature is raised or the baking time is made longer. When the water contact angle measured is larger than the afore-mentioned upper limit, the baking temperature is reduced or the baking time is made shorter. Accordingly, the conditions are adjusted. The value of the water contact angle cannot be determined merely by the composition of the soluble nitrocellulose-based resin and the baking temperature, however, the water contact angle can be adjusted to the desired value by conducting several trial and errors, when the afore-mentioned method is used.

By using the current collector of the present invention, sufficient adhesion in the interface of the resin layer and the active material layer or in the interface of the resin layer and the electrode material layer can be obtained even when the active material layer of the electrode material layer is formed and is immersed in an electrolyte solution. In addition, sufficient adhesion can be obtained in the interface of the resin layer and the conductive substrate. Further, large detachment is not observed even after charge and discharge is repeated. Accordingly, a current collector having sufficient adhesion and superior discharge rate characteristics can be obtained.

The thickness of the resin layer can be adjusted in accordance with the application of the electrode. Here, the thickness is preferably 0.1 to 5 µm, particularly preferably 0.3 to 3 µm. When the thickness is less than 0.1 µm, portions where the conductive substrate is not covered would appear, resulting in insufficient battery characteristics. When the thickness exceeds 5 µm, the active material layer must be made thin for such excess in the thickness when structuring a battery. This would result is insufficient capacity density and would make it difficult to manage with the downsizing of batteries, capacitors and the like. In addition, concerning the application in square battery, when the electrode structure is wound together with a separator, cracks are formed in the resin layer at the most inner portions of winding having an extremely small radius of curvature. This would lead to generation of detachment from the active material layer.

In order to improve the adhesion of the surface of the conductive substrate, it is effective to perform a pretreatment to the conductive substrate onto which the conductive resin layer is formed. When a metal foil manufactured by rolling is used as the substrate, there are cases where rolling oil and wear debris are left on the surface. In such cases, adhesion can be improved by removing them. In addition, adhesion can be improved by performing a dry activation treatment such as corona discharge treatment.

<3. Electrode Structure>

The electrode structure of the present invention can be obtained by forming an active material layer or an electrode material layer on one side or both sides of the conductive substrate. An electrode structure for an electrical storage device provided with the electrode material layer will be described later.

The active material layer may be a obtained by formulating an active material in a soluble nitrocellulose-based resin, thereby allowing the conductive resin layer to act as an active material layer, or may be obtained by forming another layer on the conductive resin layer. In addition, a non-aqueous electrolyte solution battery can be manufactured with the electrode structure, a separator, a non-aqueous electrolyte solution and the like. In the electrode structure for the non-aqueous battery and the non-aqueous electrolyte solution battery of the present invention, conventional parts for non-aqueous battery can be used as the parts other than the current collector.

The active material layer formed in the present invention may be the ones conventionally proposed for the non-aqueous electrolyte battery. For example, positive electrode structure of the present invention can be obtained by coating the current collector of the present invention which uses aluminum foil with a paste. Here, the coating method is a conventional method, and the paste for the positive electrode structure is obtained by using $LiCoO_2$, $LiMnO_2$, $LiNiO_2$ and the like as an active material and using carbon black such as acetylene black and the like as a conductive material, and dispersing the active material and the conductive material in PVDF, CMC (carboxymethyl cellulose, hereinafter the same) and the like as a binder. Such paste can be coated on a copper foil or an aluminum foil, and is suitable for the positive electrode structure.

The negative electrode structure of the present invention can be obtained by coating a paste onto the current collector of the present invention using a copper foil. Here, black lead (graphite), graphite, mesocarbon microbead and the like is used as the active material. The paste can be obtained by dispersing the active material in CMC as a thickening agent, and then mixing the resulting dispersion with SBR as a binder. Such paste can be coated on a copper foil or an aluminum foil, and is suitable for the negative electrode structure.

<4. Usage of Electrode Structure>

The electrode structure which uses the current collector of the present invention can be used in various applications as electrodes. For example, it can be used as a non-aqueous electrolyte battery, an electrical double layer capacitor, a lithium ion capacitor or an electrical storage device.

<4-1. Non-Aqueous Electrolyte Battery>

A separator is sandwiched in between the positive electrode structure and the negative electrode structure to constitute the non-aqueous electrolyte battery of the present invention. Here, the separator is immersed in an electrolyte for a non-aqueous electrolyte battery, containing a non-aqueous electrolyte. As the non-aqueous electrolyte and the separator, conventional ones used for the non-aqueous electrolyte battery can be used. For example, as the solvent of the electrolyte, carbonates, lactones and the like can be used. Here, $LiPF_6$ or $LiBF_4$ as electrolytes dissolved in a mixture of EC (ethylene carbonate) and EMC (ethylmethyl carbonate) can be used. As the separator, a membrane made of polyolefin having microporous can be used for example.

<4-2. Electrical Storage Device (Electrical Double Layer Capacitor, Lithium Ion Capacitor and the Like)

The electrode of the present invention can be used for an electrical double layer capacitor and a lithium ion capacitor, which have a demand for longer lifetime with the ability to charge and discharge at a large current density. Here, the electrode of the present invention can be manufactured by a conventional method. In the electrical double layer capacitor, electrode material layer of both of the positive electrode and the negative electrode are usually structured with an electrode material, a conductive material and a binder. In contrast, the electrical double layer capacitor of the present invention can be structures with the afore-mentioned electrode structure, a separator, an electrolyte solution and the like. In the electrode structure for the electrical double layer capacitor and the electrical double layer of the present invention, conventional parts for the electrical double layer capacitor can be used regarding the parts other than the electrodes. In particular, an electrode material used conventionally for the electrical double layer capacitor can be used as the electrode material. For example, carbon powder such as activated charcoal and black lead (graphite), or carbon fiber can be used. As the conductive material, carbon black such as acetylene black can be used. As the binder, PVDF and SBR can be used for example. The electrical double layer capacitor can be structured by sandwiching a separator in between the electrode structures of the present invention, and then immersing the separator in the electrolyte solution. As the separator, a membrane made of polyolefin having microporous, a non-woven fabric for an electrical double layer capacitor and the like can be used for example. Regarding the electrolyte solution, carbonates and lactones can be used as the solvent for example, and tetraethylammonium salt, triethylmethylammonium salt and the like can be used as the electrolyte, and hexafluorophosphate, tetrafluoroborate and the like can be used as the negative ion. Lithium ion capacitor is structured by combining a negative electrode of a lithium ion battery and a positive electrode of an electrode double layer capacitor.

EXAMPLES

<1. Preparation of Current Collector>

A resin solution was prepared by dissolving a resin shown in Table 1 in an organic solvent of MEK, by the ratio shown in Table 1. Acetylene black was added to the resin solution by 60 mass % with respect to the resin component (solid content of the resin, hereinafter the same), and then the mixture was dispersed using a ball mill for 8 hours to obtain a coating. The coating thus obtained was coated on one side of an aluminum foil with a thickness of 20 μm (JIS A1085) by a bar coater. The coating was heated for 30 seconds so that the final substrate temperature reaches the baking temperature shown in Table 1, to prepare the current collector. The thickness of the resin layer after baking was as shown in Table 1.

In Table 1, the weight of the soluble nitrocellulose is the weight of the solid content. In addition, the details of the resin provided in an abbreviated manner in Table 1 is shown in Table 2.

TABLE 1

| | | Resin | | | | | | | | | Application Conditions | |
|---|---|---|---|---|---|---|---|---|---|---|---|---|
| | | 1 | | | 2 | | | 3 | | | | |
| | | Type | Weight Average Molecular Weight | Formulation Amount (parts by mass) | Type | Weight Average Molecular Weight | Formulation Amount (parts by mass) | Type | Number Average Molecular Weight | Formulation Amount (parts by mass) | Baking Temperature (° C.) | Thickness (μm) |
| Example | 1 | Soluble Nitrocellulose 1 | — | 80 | — | — | — | Melamine 1 | 2700 | 20 | 180 | 0.05 |
| | 2 | Soluble Nitrocellulose 1 | — | 80 | — | — | — | Melamine 1 | 2700 | 20 | 180 | 1.1 |
| | 3 | Soluble Nitrocellulose 1 | — | 80 | — | — | — | Melamine 1 | 2700 | 20 | 180 | 4.8 |
| | 4 | Soluble Nitrocellulose 1 | — | 80 | — | — | — | Melamine 1 | 2700 | 20 | 180 | 5.5 |
| | 5 | Soluble Nitrocellulose 2 | — | 100 | — | — | — | — | — | — | 180 | 2.2 |
| | 6 | Soluble Nitrocellulose 3 | — | 80 | — | — | — | Melamine 1 | 2700 | 20 | 180 | 2.3 |
| | 7 | Soluble Nitrocellulose 1 | — | 40 | Epoxy 1 | 2900 | 40 | Melamine 2 | 2100 | 20 | 180 | 2.1 |

TABLE 1-continued

|  |  |  |  |  |  |  |  |  |  |  |  |  |
|---|---|---|---|---|---|---|---|---|---|---|---|---|
|  | 8 | Soluble Nitrocellulose 1 | — | 54 | Polyacetal 1 | 90000 | 16 | Melamine 2 | 2100 | 30 | 180 | 2.3 |
|  | 9 | Soluble Nitrocellulose 1 | — | 54 | Polyacetal 2 | 27000 | 16 | Melamine 2 | 2100 | 30 | 180 | 2.4 |
|  | 10 | Soluble Nitrocellulose 1 | — | 64 | Polyacetal 2 | 27000 | 21 | Melamine 2 | 2100 | 15 | 180 | 2.1 |
|  | 11 | Soluble Nitrocellulose 1 | — | 54 | Acryl 1 | 70000 | 16 | Melamine 2 | 2100 | 30 | 180 | 2.1 |
|  | 12 | Soluble Nitrocellulose 1 | — | 64 | Acryl 1 | 70000 | 21 | Melamine 3 | 2500 | 15 | 180 | 2.2 |
|  | 13 | Soluble Nitrocellulose 1 | — | 64 | Acryl 1 | 70000 | 21 | Melamine 3 | 2500 | 15 | 90 | 2.2 |
|  | 14 | Soluble Nitrocellulose 1 | — | 64 | Acryl 1 | 70000 | 21 | Melamine 3 | 2500 | 15 | 130 | 2.2 |
|  | 15 | Soluble Nitrocellulose 1 | — | 64 | Acryl 1 | 70000 | 21 | Melamine 3 | 2500 | 15 | 180 | 2.2 |
|  | 16 | Soluble Nitrocellulose 1 | — | 64 | Acryl 1 | 70000 | 21 | Melamine 3 | 2500 | 15 | 250 | 2.2 |
|  | 17 | Soluble Nitrocellulose 1 | — | 75 | Acryl 2 | 80000 | 19 | Melamine 1 | 2700 | 6 | 180 | 2.3 |
|  | 18 | Soluble Nitrocellulose 2 | — | 60 | Polyacetal 1 | 90000 | 40 | — | — | — | 180 | 2.4 |
|  | 19 | Soluble Nitrocellulose 2 | — | 60 | Acryl 2 | 80000 | 40 | — | — | — | 180 | 2.4 |
|  | 20 | Soluble Nitrocellulose 2 | — | 60 | Epoxy 2 | 900 | 40 | — | — | — | 180 | 2.3 |
|  | 21 | Soluble Nitrocellulose 2 | — | 60 | Pyromellitic Acid | — | 40 | — | — | — | 180 | 2.1 |
|  | 22 | Soluble Nitrocellulose 2 | — | 60 | Isophthalic Acid | — | 40 | — | — | — | 180 | 2.3 |
|  | 23 | Soluble Nitrocellulose 2 | — | 60 | Acrylonitrile | — | 40 | — | — | — | 180 | 2.2 |
| Comparative Example | 1 | Ethyl Cellulose | 70000 | 100 | — | — | — | — | — | — | 180 | 2.3 |
|  | 2 | Ethyl Cellulose | 70000 | 70 | Polyacetal 1 | 90000 | 30 | — | — | — | 180 | 2.3 |
|  | 3 | Ethyl Cellulose | 70000 | 70 | Acryl 1 | 70000 | 30 | — | — | — | 180 | 2.1 |
|  | 4 | Ethyl Cellulose | 70000 | 70 | Epoxy 1 | 2900 | 30 | — | — | — | 180 | 2.2 |
|  | 5 | Methyl Cellulose | 70000 | 70 | — | — | — | Melamine 1 | 2700 | 30 | 180 | 2.1 |
|  | 6 | Methyl Cellulose | 70000 | 50 | Polyacetal 1 | 90000 | 30 | Melamine 1 | 2700 | 20 | 180 | 2.3 |
|  | 7 | Methyl Cellulose | 70000 | 50 | Acryl 1 | — | 30 | Melamine 1 | 2700 | 20 | 180 | 2.4 |
|  | 8 | Methyl Cellulose | 70000 | 50 | Epoxy 1 | 2900 | 30 | Melamine 1 | 2700 | 20 | 180 | 2.5 |

|  |  | Resistance of Resin Layer (mΩ) | Adhesion Between Resin Layer and Aluminum | Contact Angle | Grade of Discharge Rate Characteristics | Discharge Rate Characteristics | | | | | | Lifetime | |
|---|---|---|---|---|---|---|---|---|---|---|---|---|---|
|  |  |  |  |  |  | Lithium ion Battery | | | Electrical Double Layer Capacitor | | | Lithium ion Battery | Electrical Double Layer Capacitor |
|  |  |  |  |  |  | 5 C | 10 C | 20 C | 100 C | 300 C | 500 C | | |
| Example | 1 | 64 | E | 93 | E | 83 | 71 | 68 | 92 | 75 | 68 | C | C |
|  | 2 | 78 | D | 96 | D | 86 | 78 | 71 | 93 | 76 | 73 | B | B |
|  | 3 | 189 | D | 96 | D | 86 | 77 | 72 | 82 | 77 | 73 | B | B |
|  | 4 | 253 | E | 95 | E | 84 | 72 | 66 | 81 | 74 | 67 | C | C |
|  | 5 | 56 | E | 98 | E | 83 | 72 | 67 | 90 | 73 | 66 | C | C |
|  | 6 | 92 | D | 102 | D | 87 | 79 | 73 | 93 | 78 | 74 | B | B |
|  | 7 | 423 | C | 108 | C | 88 | 83 | 76 | 95 | 81 | 78 | B | B |

TABLE 1-continued

|  |  |  |  |  |  |  |  |  |  |  |  |  |
|---|---|---|---|---|---|---|---|---|---|---|---|---|
|  | 8 | 261 | B | 193 | B | 93 | 86 | 80 | 97 | 86 | 83 | A | A |
|  | 9 | 263 | A | 98 | B | 94 | 87 | 83 | 97 | 87 | 85 | A | A |
|  | 10 | 240 | A | 97 | A | 97 | 93 | 87 | 99 | 93 | 89 | A | A |
|  | 11 | 176 | A | 104 | B | 91 | 88 | 82 | 96 | 86 | 84 | A | A |
|  | 12 | 154 | A | 101 | A | 98 | 94 | 89 | 98 | 94 | 88 | A | A |
|  | 13 | 155 | C | 85 | B | 92 | 85 | 80 | 96 | 87 | 81 | A | A |
|  | 14 | 167 | B | 90 | A | 96 | 92 | 86 | 99 | 93 | 87 | A | A |
|  | 15 | 156 | A | 110 | A | 97 | 93 | 88 | 99 | 94 | 88 | A | A |
|  | 16 | 153 | A | 117 | B | 91 | 87 | 81 | 97 | 58 | 84 | A | A |
|  | 17 | 164 | A | 95 | A | 98 | 95 | 88 | 98 | 94 | 87 | A | A |
|  | 18 | 142 | C | 99 | C | 87 | 82 | 77 | 95 | 83 | 76 | B | B |
|  | 19 | 128 | C | 97 | C | 89 | 81 | 78 | 94 | 82 | 78 | B | B |
|  | 20 | 199 | E | 109 | E | 84 | 71 | 66 | 90 | 74 | 68 | C | C |
|  | 21 | 128 | D | 104 | D | 86 | 77 | 72 | 93 | 77 | 71 | C | C |
|  | 22 | 131 | D | 102 | D | 85 | 78 | 73 | 92 | 76 | 72 | C | C |
|  | 23 | 118 | D | 103 | D | 86 | 78 | 70 | 93 | 78 | 73 | C | C |
| Comparative | 1 | 2530 | B | 98 | G | 72 | 61 | 51 | 88 | 63 | 54 | D | D |
| Example | 2 | 3180 | B | 105 | G | 73 | 62 | 50 | 87 | 62 | 53 | D | D |
|  | 3 | 3210 | B | 97 | G | 73 | 61 | 52 | 86 | 63 | 57 | D | D |
|  | 4 | 4040 | B | 108 | G | 72 | 63 | 53 | 87 | 61 | 54 | D | D |
|  | 5 | 2660 | A | 106 | F | 76 | 69 | 56 | 86 | 67 | 56 | D | D |
|  | 6 | 3340 | A | 103 | F | 78 | 68 | 56 | 88 | 68 | 59 | D | D |
|  | 7 | 3290 | A | 101 | F | 77 | 67 | 57 | 88 | 66 | 58 | D | D |
|  | 8 | 3410 | A | 107 | F | 76 | 67 | 55 | 56 | 69 | 57 | D | D |

TABLE 2

| Abbreviated Name in Table 1 | Details |
|---|---|
| Soluble Nitrocellulose 1 | JIS K6703L1/4 |
| Soluble Nitrocellulose 2 | JIS K6703L1/8 |
| Soluble Nitrocellulose 3 | JIS K6703H1/4 |
| Epoxy 1 | Bisphenol A type Epoxy |
| Epoxy 2 | Bisphenol F type Epoxy |
| Acryl 1 | Acryl Copolymer (Methyl Acrylate:Methacrylic Acid = 95:5) |
| Acryl 2 | Acryl Copolymer (Acryl Amide:Hydroxyalkyl Acrylate:Acrylic Acid = 40:50:10) |
| Melamine 1 | Butylated Melamine |
| Melamine 2 | Methylated Melamine |
| Melamine 3 | Isobutylated Melamine |
| Polyacetal 1 | Polyvinyl Butyral |
| Polyacetal 2 | Polyvinyl Acetoacetal |

<2. Evaluation>

<2-1. Measurement of the Resistance of Resin Layer of Current Collector, Measurement of Water Contact Angle, and Evaluation of Adhesion Between Substrate and Resin Layer>

The thickness, resistance, and water contact angle or the resin layer of the current collector, and the adhesion between the substrate and the resin layer was evaluated. The results are shown in Table 1.

Regarding the thickness of the resin layer, film thickness measuring machine "HAKATTARO G" (available from SEIKO-em) was used to calculate the thickness of the resin layer as a difference in the thickness between the portion formed with the resin layer and the portion without the resin (portion only with the aluminum foil).

The resistance of the resin layer was measured as follows. A sample was placed on a surface plate with the surface having the coating facing upward, and then a 20 mm-cube block made of copper was placed on the coating (the surface which comes in contact with the coating was mirror finished). The electrical resistance between the copper block and the aluminum foil was measured with the condition in which a load of 700 gf was applied.

Water contact angle was obtained using a contact angle meter (Drop Master DM-500, available from Kyowa Interface Science Co., LTD.). First, 1 μl of water droplets were adhered on the surface of the resin layer in a thermostatic chamber at 23° C., and then the contact angle after 2 seconds was measured by θ/2 method. Adhesion was evaluated by the conditions of detachment when Cellotape (available from NICHIBAN CO., LTD.) was attached on the surface of the resin layer, and was then peeled off at once.

A: No Detachment
B: Approximately ¼ Detached
C: Approximately ½ Detached
D: Approximately ¾ Detached
E: Whole Surface Detached <2-2. Evaluation of Discharge Rate Characteristics and Electrode Lifetime of Lithium Ion Battery>

Lithium ion batteries were prepared by using the current collector prepared by the afore-mentioned method. The discharge rate characteristics and the battery lifetime were evaluated in accordance with the following manner. The results are shown in Table 1.

(Preparation of Lithium Ion Battery)

A positive electrode was prepared as follows. A paste was prepared by dispersing $LiCoO_2$ as an active material and acetylene black as a conductive material in PVDF (polyvinylidene fluoride) as a binder. The paste thus obtained was coated on the current collector electrode so that the thickness of the coating is 70 μm, to give the positive electrode. A negative electrode was prepared as follows. A paste was prepared by dispersing black lead (graphite) as an active material in CMC (carboxymethyl cellulose), followed by the addition of SBR (styrene butadiene rubber) as a binder. The paste thus obtained was coated on a copper foil with a thickness of 20 μm so that the thickness of the coating is 70 μm, to give the negative electrode. A microporous separator made of polypropylene was sandwiched by these electrode structures, and was then cased in the battery casing to obtain a coin battery. A 1 mol/L solution of $LiPF_6$ in a solvent mixture of EC (ethylene carbonate) and EMC (ethylmethyl carbonate) was used as the electrolyte solution.

(Method for Evaluating Discharge Rate Characteristics)

Discharge capacity of these lithium ion batteries (based on 0.2C, unit %) was observed for the discharge current rate of 1C, 5C, 10C, and 20C, when the upper voltage limit of charged state was 4.2 V, charge current was 0.2C, discharge final voltage was 2.8 V, and the temperature was 25° C. (Here, 1C is the value of the current A) when the current capacity (Ah) of the battery is taken out in 1 hour (h). At 20C, the current capacity of the battery can be taken out in ½oh=3 min. On the other hand, the battery can be charged in 3 minutes.)

(Method for Evaluating Lifetime of Electrode)

The battery was first charged at an electrolyte solution temperature of 40° C., upper limit voltage of 4.2V, and a charging current of 20C. Then the battery was discharged to a final voltage of 2.8V, at a discharging current of 20C. Number of cycles when the discharge capacity reaches 60% of the discharge capacity of the first cycle was observed (maximum 500 cycles), and was evaluated in accordance with the following criteria.

A: 500 cycles or more
B: 450 cycles or more and less than 500 cycles
C: 400 cycles or more and less than 450 cycles
D: less than 400 cycles <2-3. Evaluation of Discharge Rate Characteristics and Electrode Lifetime of Electrical Double Layer Capacitor>

Electrical double layer capacitors were prepared by using the current collector prepared by the afore-mentioned method. The discharge rate characteristics and the battery lifetime were evaluated in accordance with the following manner. The results are shown in Table 1.

(Preparation of Electrical Double Layer Capacitor)

A paste was prepared by dispersing activated charcoal as an electrode material and Ketjen black as a conductive material in PVDF as a binder. The paste thus obtained was coated on the current collector electrode so that the thickness of the coating is 70 μm, to give the positive and negative electrode structures. A non-woven fabric for an electrical double layer capacitor immersed in the electrolyte solution was sandwiched and fixed by two of these electrode structures, and thus the electrical double layer capacitor was structured. A solution obtained by adding 1.5 mol/L solution of TEMA (triethylmethyl ammonium) and tetrafluoroboric acid in propylene carbonate as a solvent was used as the electrolyte solution.

(Method for Evaluating Discharge Rate Characteristics)

Discharge capacity of these electrical double layer capacitors (based on 1C, unit %) was observed for the discharge current rate of 100C, 300C, and 500C, when the upper voltage limit of charged state was 2.8 V, charge current was 1C, condition for the completion of charging was 2 hours, discharge final voltage was 0 V, and the temperature was 25° C.

(Method for Evaluating Lifetime of Electrode)

The capacitor was first charged at an electrolyte solution temperature of 40° C., upper limit voltage of 2.8V, and a charging current of 500C. Then the battery was discharged to a final voltage of 0V, at a discharging current of 500C. Number of cycles when the discharge capacity reaches 80% of the discharge capacity of the first cycle was observed (maximum 5000 cycles), and was evaluated in accordance with the following criteria.

A: 5000 cycles or more
B: 4500 cycles or more and less than 5000 cycles
C: 4000 cycles or more and less than 4500 cycles
D: less than 4000 cycles <2-4. Conclusion>

From the results shown in Table 1, it can be concluded that Examples 1 to 23, provided with a conductive resin layer, have superior discharge rate characteristics and battery lifetime, when compared with Comparative Examples 1 to 8, provided with a resin layer of ethyl cellulose.

In addition, when the results of Examples 8 to 17 are compared with the results of other Examples, it can be concluded that when the soluble nitrocellulose-based resin contains at least one of the resins selected from the group consisting of a melamine-based resin, an acryl-based resin, a polyacetal-based resin, and an epoxy-based resin; in addition to a soluble nitrocellulose, highly superior results can be obtained in both of the discharge rate characteristics and the battery lifetime.

The invention claimed is:

1. A positive electrode structure of lithium ion battery, comprising:
    a conductive substrate,
    a conductive resin layer provided on one side or both sides of the conductive substrate; and
    an active material comprising lithium metal oxide;
    wherein
    the conductive resin layer contains a soluble nitrocellulose-based resin and a conductive material, wherein
    the soluble nitrocellulose-based resin comprises a soluble nitrocellulose, wherein a nitrogen concentration of the soluble nitrocellulose is 10 to 13%, and at least one resin selected from the group consisting of a melamine-based resin, an acryl-based resin, a polyacetal-based resin, and an epoxy-based resin, and
    the soluble nitrocellulose is contained by 40 to 90 mass % when the total of the at least one resin and the soluble nitrocellulose is 100 mass %.

2. The positive electrode structure of claim 1, wherein the soluble nitrocellulose-based resin comprises the melamine-based resin, the soluble nitrocellulose, and at least one resin selected from the group consisting of the acryl-based resin and the polyacetal-based resin.

3. The positive electrode structure of claim 2, wherein the melamine-based resin is-contained by 5 to 55 mass %.

4. The positive electrode structure of claim 1, wherein a surface of the conductive resin layer has a water contact angle of 80 degrees to 125 degrees when measured by θ/2 method in a thermostatic chamber at 23° C.

5. The positive electrode structure of claim 4, wherein the water contact angle is 90 degrees to 110 degrees.

6. The positive electrode structure of claim 1, further comprising: an active material layer provided on the conductive resin layer.

7. The positive electrode structure of claim 1, wherein the conductive resin layer contains the active material.

8. A lithium ion battery, comprising the positive electrode structure of claim 1.

* * * * *